(No Model.)

D. C. CRIPE.
MILK CAN.

No. 276,780. Patented May 1, 1883.

WITNESSES
Villetto Anderson.
Philip C. Masi.

INVENTOR
David C. Cripe,
by Anderson & Smith
his ATTORNEYS

N. PETERS. Photo-Lithographer, Washington, D. C.

UNITED STATES PATENT OFFICE.

DAVID C. CRIPE, OF NORTH MANCHESTER, INDIANA.

MILK-CAN.

SPECIFICATION forming part of Letters Patent No. 276,780, dated May 1, 1883.

Application filed January 26, 1883. (No model.)

*To all whom it may concern:*

Be it known that I, DAVID C. CRIPE, a citizen of the United States, resident at North Manchester, in the county of Wabash and State of Indiana, have invented certain new and useful Improvements in Milk-Cans; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
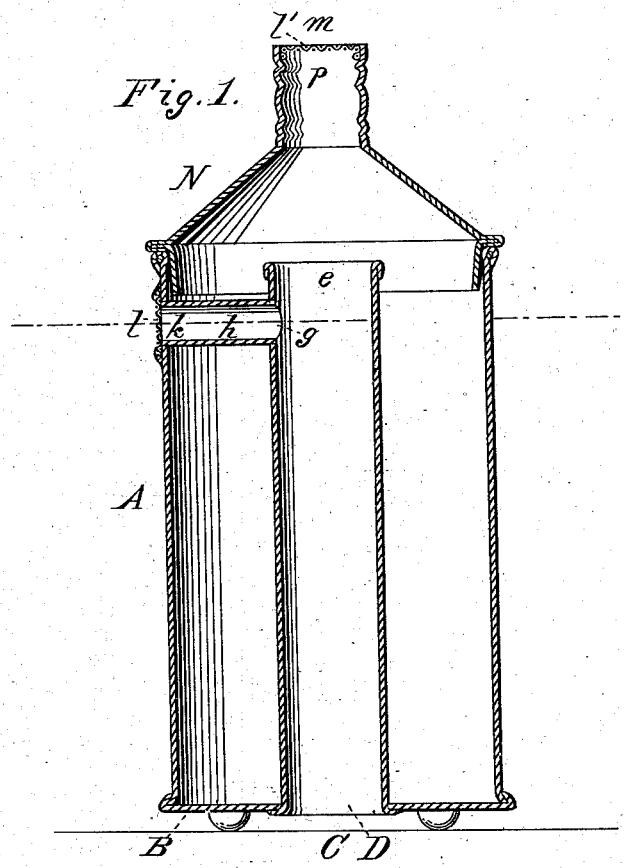
Figure 2:
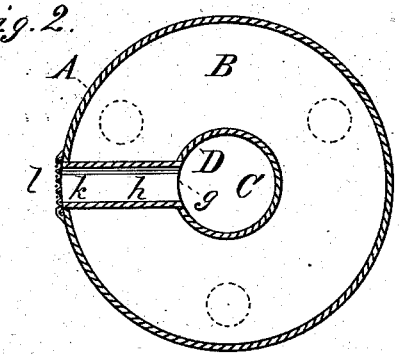

Figure 1 of the drawings is a representation of this invention, and shows a vertical section. Fig. 2 is a cross-section through the body of the can.

This invention has relation to new and useful improvements in milk-cans; and it consists in the construction and novel arrangement of a central tube open at top and bottom, extending from the bottom of the can to near its top, a cross-tube extending from the upper portion of the central tube laterally to the wall of the can, and having a wire-gauze guard at its open outer end, and a lid raised above the upper end of the central tube, and having an air-outlet, also guarded at its outer end with wire-cloth, all as hereinafter set forth, and particularly pointed out in the appended claim.

The object of this invention is to provide a can which will guard the milk from insects and extraneous matter, and will at the same time ventilate it and cool it in an expeditious manner.

In the accompanying drawings, the letter A designates the body of the can, which is usually made in cylindrical form, with an annular bottom, B, from the opening c of which a central tube, D, extends upward nearly to the top of the can, said tube being open at its upper end, as indicated at e.

Near the upper end of the tube an opening, g, is formed, from which a small tube, h, extends laterally to the side wall of the can, through which an opening is made for the outer end of the tube, as indicated at k. This opening is provided with a finely-perforated guard, l, wire-cloth being preferred.

N represents the lid, which is raised above the top of the tube D, and is provided with outlet m, preferably constructed through the tubular central projection, p, which serves as a handle. This outlet is also provided with a perforated guard, l', at its end.

The can is designed in warm weather to be immersed in water, the latter rising about half-way to the top of the cross-tube, or to the circumscribed marks on the exterior of the can. The heat of the milk will set up a circulation in the water, so that cool currents will be constantly ascending on the exterior and in the tube. The upper part of the central tube assists the air-draft, the current entering through the lateral horizontal tube h, and, after passing over the milk, escaping with the odors therefrom at the outlet through the center of the lid. In this manner the milk will be cooled and purified, while the entrance of insects is prevented. Should dust fall through the gauze of the outlet in the lid, it will be received in the central tube, and, falling in the water within the same, will not affect the milk.

Having described this invention, what I claim, and desire to secure by Letters Patent, is—

A milk-can having a central tube open at top and bottom, extending from the bottom of the can to near its top, a cross-tube or air-inlet extending from the upper portion of the central tube to the wall of the can, and having a wire-gauze guard at its outer open end, and a lid raised above the upper end of the central tube, and having a central air-outlet, also provided with a wire-gauze guard, substantially as specified.

In testimony whereof I affix my signature in presence of two witnesses.

DAVID C. CRIPE.

Witnesses:
JACOB HARTER,
ABRAHAM MILLEN.